US007913587B2

(12) United States Patent
Imura

(10) Patent No.: US 7,913,587 B2
(45) Date of Patent: Mar. 29, 2011

(54) INTERNAL COMBUSTION ENGINE AND VEHICLE HAVING THE INTERNAL COMBUSTION ENGINE

(75) Inventor: Yousuke Imura, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 646 days.

(21) Appl. No.: 12/044,782

(22) Filed: Mar. 7, 2008

(65) Prior Publication Data

US 2008/0227578 A1 Sep. 18, 2008

(30) Foreign Application Priority Data

Mar. 13, 2007 (JP) ................................ 2007-063068

(51) Int. Cl.
*F16H 37/06* (2006.01)

(52) U.S. Cl. ................................ 74/665 GA; 74/665 G

(58) Field of Classification Search ................ 74/665 F, 74/665 G, 665 GA
See application file for complete search history.

(56) References Cited

U.S. PATENT DOCUMENTS 5,564,518 A * 10/1996 Ishii et al. .................... 180/242
6,170,597 B1 * 1/2001 Fukuda ......................... 180/292
6,601,474 B2 * 8/2003 Ishimaru et al. ......... 74/665 GA
7,475,617 B2 * 1/2009 Gleasman et al. .......... 74/665 B

FOREIGN PATENT DOCUMENTS

JP 2003-161133 6/2003

* cited by examiner

*Primary Examiner* — Ha D. Ho
(74) *Attorney, Agent, or Firm* — Haynes and Boone, LLP

(57) ABSTRACT

An engine (internal combustion engine), in accordance with an embodiment, includes: a crankcase; a crankshaft accommodated in the crankcase; a first crank gear and a second crank gear disposed inside the crankcase to rotate about the crankshaft; a balancer gear meshed with the first crank gear to rotate as the first crank gear rotates; and a water pump part having a water pump gear. The water pump gear is meshed with the second crank gear to rotate as the second crank gear rotates. The balancer gear and the water pump gear are disposed to overlap each other as viewed from an end of the crankshaft.

20 Claims, 6 Drawing Sheets

INTERNAL COMBUSTION ENGINE AND VEHICLE HAVING THE INTERNAL COMBUSTION ENGINE

CROSS-REFERENCE TO RELATED APPLICATIONS

This application is related to and claims priority to Japanese Patent Application No. 2007-063068, filed on Mar. 13, 2007, the entire contents of which is incorporated herein by reference in its entirety.

TECHNICAL FIELD

The present invention relates generally to an internal combustion engine and a vehicle including the internal combustion engine, and more specifically to an internal combustion engine including a pump part and a vehicle including the internal combustion engine.

BACKGROUND

Conventionally, motorcycles (or other types of vehicles) provided with an engine (internal combustion engine) including a coolant pump (pump part) are known. For example, Japanese Patent Document JP-B-3820970 discloses a lubricant cooling structure for an engine including: an oil pump drive gear (first gear) and a primary drive gear (second gear) that rotate together with a crankshaft; an oil pump idler gear meshed with the oil pump drive gear to rotate as the oil pump drive gear rotates; and a coolant pump gear (pump gear) meshed with the primary drive gear to rotate as the primary drive gear rotates. In this engine, the oil pump idler gear and the coolant pump gear are disposed inside a crankcase so as not to overlap each other as viewed from the extending direction of the crankshaft (from a side).

However, for this engine, because the oil pump idler gear and the coolant pump gear (pump gear) are disposed inside the crankcase so as not to overlap each other as viewed from the extending direction of the crankshaft (from a side), it is necessary to secure a space to be occupied by the oil pump idler gear and the coolant pump gear, which are respectively meshed with the oil pump drive gear (first gear) and the primary drive gear (second gear) which rotate together with the crankshaft inside the crankcase, in the direction perpendicular to the extending direction of the crankshaft. Therefore, the size of the engine (internal combustion engine) is increased in the direction perpendicular to the extending direction of the crankshaft. That is, the size of the internal combustion engine is increased as viewed from an end of the crankshaft.

SUMMARY

The present invention, in accordance with one or more embodiments, addresses the foregoing problem, and therefore for an embodiment provides an internal combustion engine that is not increased in size as viewed from an end of the crankshaft and a vehicle including the internal combustion engine.

In accordance with an embodiment, a first aspect of the present invention is directed to an internal combustion engine including: a crankcase; a crankshaft accommodated in the crankcase; a first gear and a second gear disposed inside the crankcase to rotate about the crankshaft; a third gear meshed with the first gear to rotate as the first gear rotates; and a pump part having a pump gear, in which the pump gear is meshed with the second gear to rotate as the second gear rotates; and the third gear and the pump gear are disposed to overlap each other as viewed from an end of the crankshaft.

According to the first aspect in accordance with an embodiment, the third gear and the pump gear are disposed to overlap each other as viewed from an end of the crankshaft as described above. Therefore, it is possible to reduce the space to be occupied by the third gear and the pump gear as viewed from an end of the crankshaft, unlike the case where the third gear and the pump gear are disposed so as not to overlap each other as viewed from an end of the crankshaft. This makes it possible to restrain an increase in the size of the internal combustion engine as viewed from an end of the crankshaft.

In the internal combustion engine according to the first aspect, in accordance with an embodiment, the pump part further includes a water pump unit having a coolant flow-in port and a coolant flow-out port. According to this configuration, coolant can be easily circulated by the coolant flow-in port and the coolant flow-out port.

In the internal combustion engine according to the first aspect, in accordance with an embodiment, the pump part further includes: a first rotary shaft that rotates together with the pump gear; and an impeller attached to the first rotary shaft, with the pump gear disposed between the impeller and the third gear. According to this configuration, the pump gear is disposed to overlap the third gear and the impeller as viewed from an end of the crankshaft, making it possible to restrain an increase in the size of the internal combustion engine as viewed from an end of the crankshaft.

In the internal combustion engine according to the first aspect, in accordance with an embodiment, the pump part further includes: a first rotary shaft that rotates together with the pump gear; and a first restriction member for restraining axial movement of the first rotary shaft. According to this configuration, the first restriction member can easily restrain axial movement of the first rotary shaft even if the first rotary shaft is applied with axial force.

In the internal combustion engine in which the pump part includes the first rotary shaft and the first restriction member, in accordance with an embodiment, the first rotary shaft includes a first outer peripheral groove formed in an outer peripheral surface of the first rotary shaft, with the first restriction member including an engagement part to be engaged with the first outer peripheral groove of the first rotary shaft. According to this configuration, the first restriction member can be easily engaged with the first rotary shaft.

In this case, in accordance with an embodiment, the engagement part of the first restriction member includes: an engagement hole to be engaged with the first outer peripheral groove of the first rotary shaft; and an insertion hole formed to be continuous with the engagement hole and having a hole diameter larger than a diameter of the first rotary shaft. According to this configuration, the first restriction member can be further easily engaged with the first rotary shaft by inserting the first rotary shaft into the insertion hole of the engagement part and having the first outer peripheral groove of the first rotary shaft engaged with the engagement hole which is continuous with the insertion hole.

The internal combustion engine in which the pump part includes the first rotary shaft and the first restriction member, in accordance with an embodiment, further includes: a first bearing member disposed on a side of the crankcase; and a second rotary shaft that rotates together with the third gear, with the first bearing member configured to rotatably support the second rotary shaft of the third gear, and with the pump part further including a second bearing member for rotatably supporting the first rotary shaft of the pump gear. According to this configuration, the first bearing member disposed on a side of the crankcase allows the second rotary shaft to rotate stably, allowing the balancer gear to rotate stably. Also, the second bearing member of the pump part allows the first rotary shaft to rotate stably, allowing the pump gear to rotate stably.

In the internal combustion engine in which the pump part includes the first rotary shaft and the first restriction member, in accordance with an embodiment, the pump part further includes a second restriction member for restraining the pump gear from slipping off from the first rotary shaft, with the first rotary shaft further including a second outer peripheral groove formed in an outer peripheral surface of the first rotary shaft to be engaged with the second restriction member. According to this configuration, the second restriction member and the second outer peripheral groove can easily restrain the pump gear from slipping off from the first rotary shaft.

In the internal combustion engine according to the first aspect, in accordance with an embodiment, the pump gear and the third gear are configured to be positioned higher than an oil surface of oil reserved inside the crankcase. According to this configuration, it is possible to restrain the third gear and the pump gear from contacting the oil reserved in the oil pan, and thus to further restrain a loss of driving force due to such contact.

The internal combustion engine according to the first aspect, in accordance with an embodiment, further includes a crankcase cover provided to cover at least a part of a surface of the crankcase, with the pump part attached to the crankcase cover. According to this configuration, the pump gear included in the pump part can be easily disposed to overlap the third gear disposed inside the crankcase as viewed from an end of the crankshaft.

The internal combustion engine according to the first aspect, in accordance with an embodiment, further includes a second rotary shaft that rotates together with the third gear, with the third gear including a balancer gear, with an extension of the second rotary shaft of the balancer gear disposed within a radius of the pump gear, and with an extension of the first rotary shaft of the pump gear disposed within a radius of the balancer gear. According to this configuration, the balancer gear and the pump gear may be disposed to overlap each other to a greater extent as viewed from an end of the crankshaft, and thus the space to be occupied by the balancer gear and the pump gear may be reduced as viewed from an end of the crankshaft.

In the internal combustion engine according to the first aspect, in accordance with an embodiment, the second gear is formed such that a diameter of the second gear is smaller than that of the first gear. According to this configuration, the rotational speed of the pump gear can be reduced while restraining an increase in the size of the pump gear which is engaged with the second gear.

In accordance with an embodiment, a second aspect of the present invention is directed to a vehicle including the internal combustion engine with any one of the configurations described above. According to this configuration, it is possible to easily obtain a vehicle provided with an internal combustion engine that is not increased in size as viewed from an end of the crankshaft.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
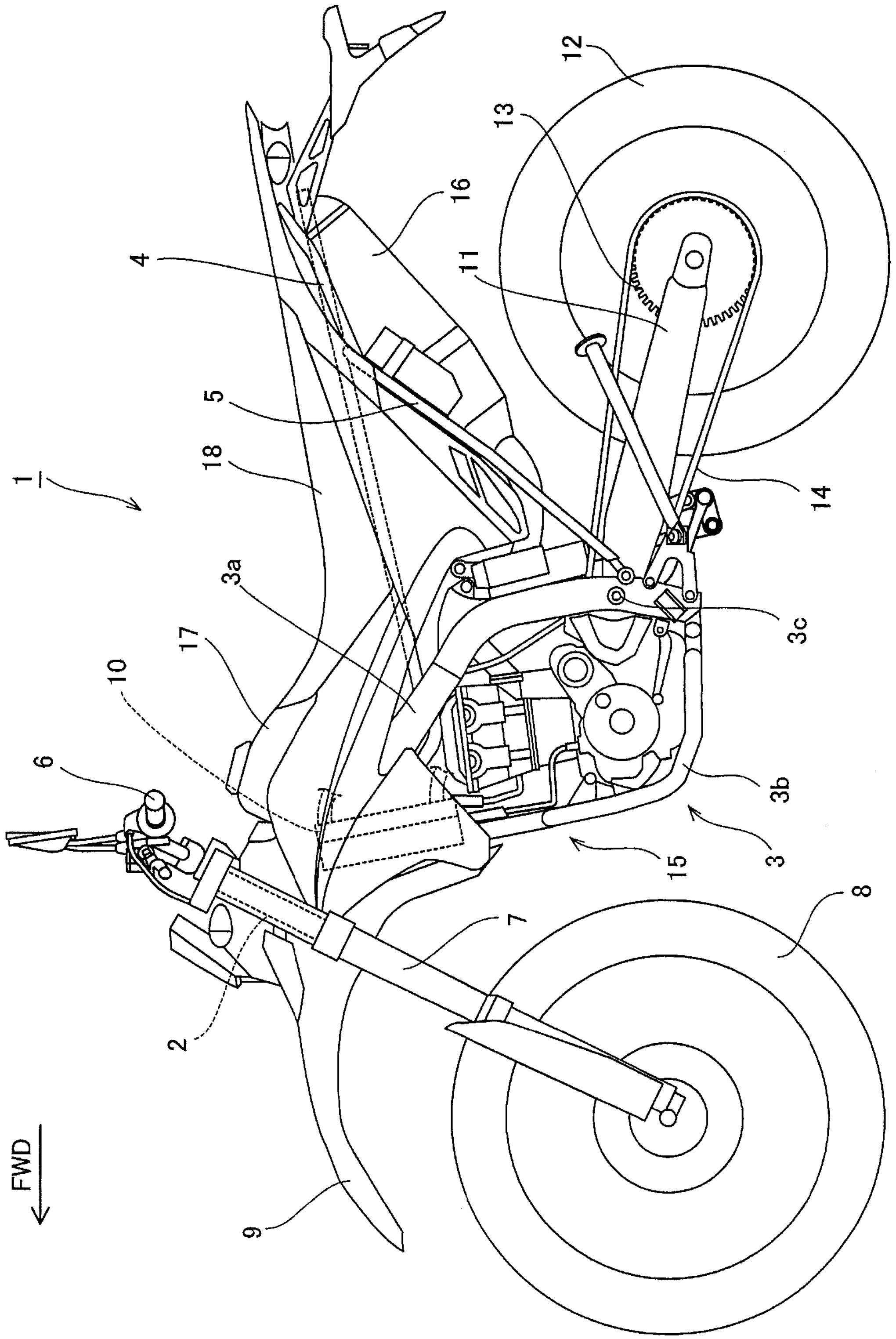
FIG. 1 is a side view showing the entire structure of a motorcycle provided with an engine in accordance with an embodiment of the present invention.

The description of various reference numerals and symbols in the drawings may be set forth in accordance with one or more embodiments, for example, as follows: 1: motorcycle, 15: engine (internal combustion engine), 22: crankcase, 31: crankshaft (crankshaft), 32: first crank gear (first gear), 33: second crank gear (second gear), 34: balancer shaft (second rotary shaft), 35: balancer gear (third gear), 43: bearing (first bearing member), 53: crankcase cover, 54: water pump part (pump part), 55: water pump shaft (first rotary shaft), 55*b*: engagement groove (second outer peripheral groove), 55*c*: engagement groove (first outer peripheral groove), 56: water pump gear (pump gear), 57: impeller, 59: bearing (second bearing member), 60: plate member (first restriction member), 60*a*: engagement part, 60*b:* engagement hole, 60*c:* insertion hole, 62: circlip (second restriction member), 63*a:* coolant flow-in port, 63*b:* coolant flow-out port, and 64: water pump unit.

Embodiments of the present invention and their advantages are best understood by referring to the detailed description that follows. It should be appreciated that like reference numerals are used to identify like elements illustrated in one or more of the figures.

DETAILED DESCRIPTION

FIG. 1 is a side view showing the entire structure of a motorcycle (e.g., a type of vehicle) provided with an engine (internal combustion engine) in accordance with an embodiment of the present invention. FIGS. 2 to 10 illustrate in detail, in accordance with one or more embodiments, the structure of the engine in accordance with the embodiment shown in FIG. 1. In this embodiment, a motorcycle is described as an example of a vehicle for an embodiment of the present invention. In the drawings, the arrow FWD indicates the forward running direction of the motorcycle. First, an engine 15 in accordance with this embodiment and a motorcycle 1 provided with the engine 15 are described with reference to FIGS. 1 to 10.

In the motorcycle 1 provided with the engine (internal combustion engine) 15 in accordance with the embodiment of the present invention, as shown in FIG. 1, a main frame 3 extending longitudinally is disposed at the rear of a head pipe 2. The main frame 3 has an upper frame 3*a* extending rearward from above and a lower frame 3*b* extending downward and then rearward. A backstay 5 is connected between the upper frame 3*a* and the rear part of a seat rail 4. The head pipe 2, the main frame 3, the seat rail 4, and the backstay 5 constitute a vehicle body frame.

Handlebars 6 are rotatably attached to the top of the head pipe 2. A pair of front forks 7 having a suspension for absorbing vertical shock is disposed below the handlebars 6. A front wheel 8 is rotatably mounted at the lower end of the front forks 7. A front fender 9 is disposed above the front wheel 8. A radiator 10 is disposed at the rear of the front fork 7.

The front end of a swing arm 11 is attached to the rear end of the main frame 3 via a pivot shaft 3*c*. A rear wheel 12 is rotatably mounted at the rear end of the swing arm 11. A driven sprocket 13 is attached to the rear wheel 12 so as to rotate together with the rear wheel 12. A drive chain 14 is meshed with the driven sprocket 13. The drive chain 14 is configured to be driven by a drive sprocket 48 of the engine 15 to be discussed later. The engine 15 is mounted as interposed between the upper frame 3*a* and the lower frame 3*b* of the main frame 3. The engine 15 is an example of the "internal combustion engine" in accordance with an embodiment of the present invention. A muffler 16 is connected to the engine 15. A fuel tank 17 is disposed on top of the main frame 3. A seat 18 is disposed on top of the seat rail 4.

Figure 2:
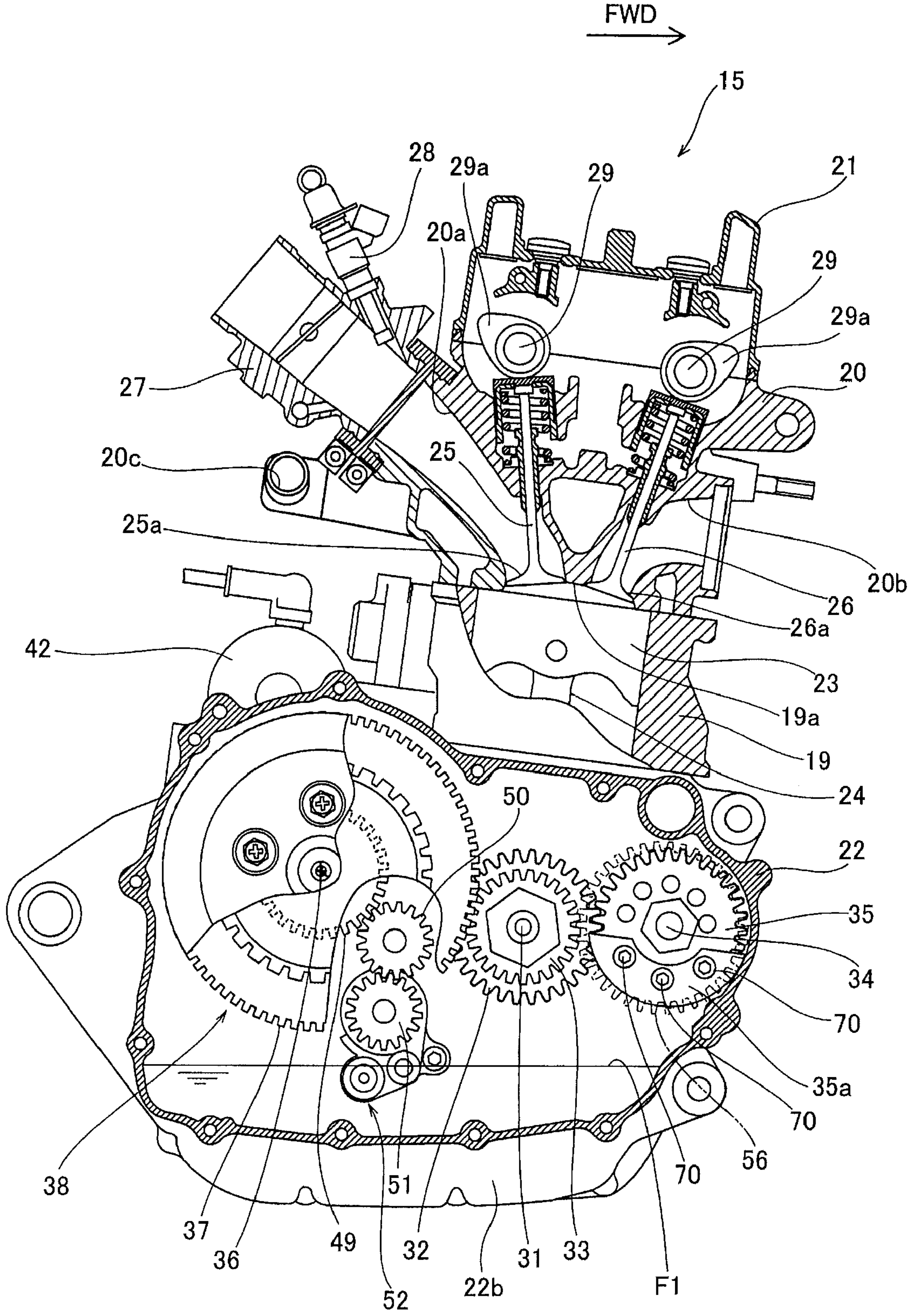
FIG. 2 is a cross sectional view of the engine provided in the motorcycle in accordance with the embodiment shown in FIG. 1.

As shown in FIG. 2, the engine 15 in accordance with this embodiment includes a cylinder 19, a cylinder head 20, a cylinder head cover 21, and a crankcase 22. A piston 23 is disposed in the cylinder 19 so as to be slidable along its inner peripheral surface. One end of a connecting rod 24 is rotatably attached to the piston 23. The cylinder head 20 is disposed to block an opening of the cylinder 19. The cylinder head 20 is formed with an intake port 20*a* and an exhaust port 20*b*. An intake valve 25, made of titanium for example, and an exhaust valve 26, made of steel for example, are disposed in the intake port 20*a* and the exhaust port 20*b*, respectively. The area of an umbrella part 25*a* of the intake valve 25 is larger than that of an umbrella part 26*a* of the exhaust valve 26. A throttle body 27 is connected to the intake port 20*a*. An injector 28 for injecting fuel into the intake port 20*a* is attached to the throttle body 27. The intake port 20*a* is provided to supply a mixture of air and fuel to a combustion chamber 19*a* of the cylinder 19. The exhaust port 20*b* is provided to exhaust a residual gas after combustion from the combustion chamber 19*a*. The muffler 16 (see FIG. 1) is connected to the exhaust port 20*b* via an exhaust pipe (not shown). A drain port 20*c* is formed in the rear of the cylinder head 20. The drain port 20*c* returns coolant warmed by the engine 15 to the radiator 10 (see FIG. 1).

Figure 3:
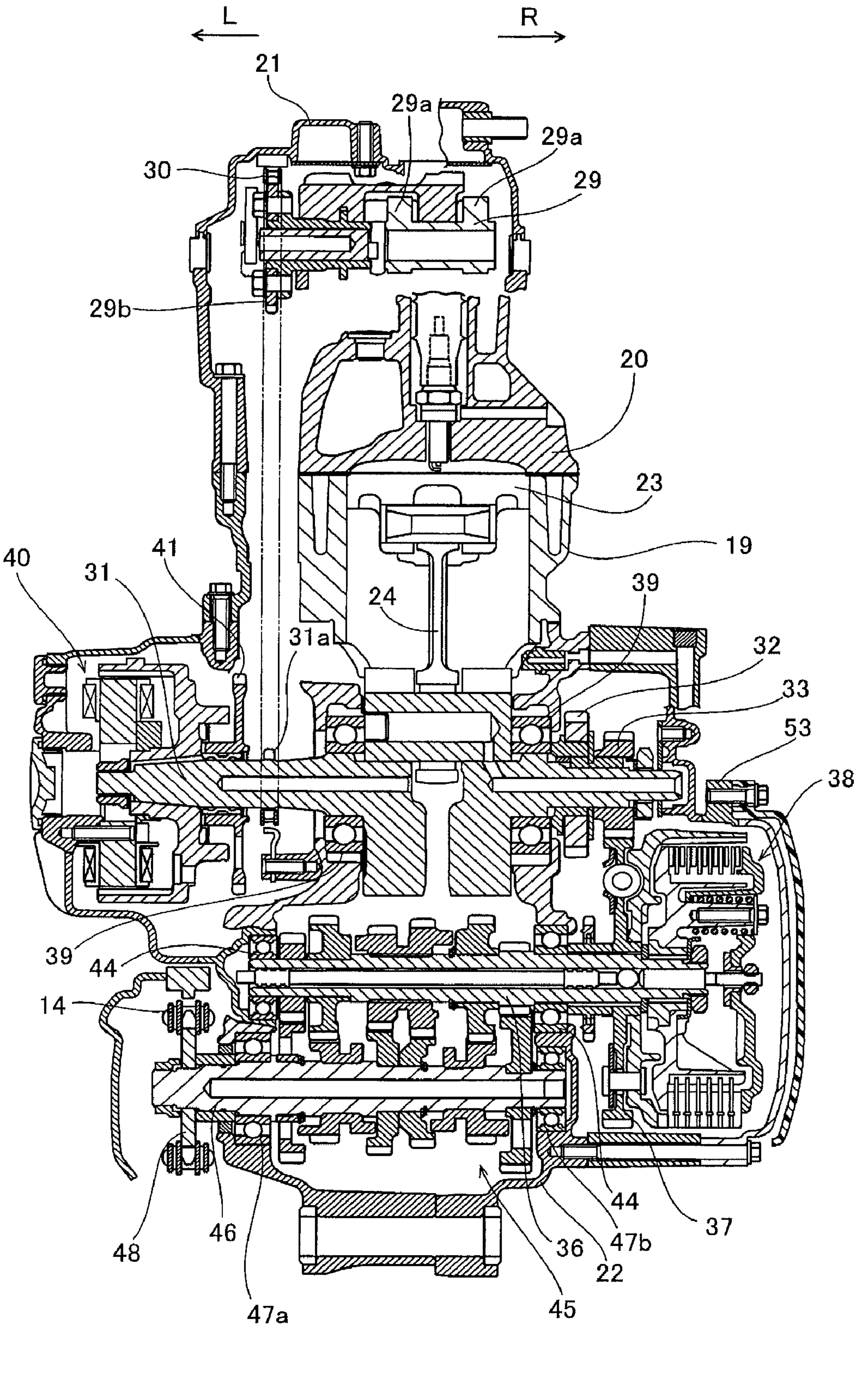
FIG. 3 is a cross sectional view of the engine provided in the motorcycle in accordance with the embodiment shown in FIG. 1.

The cylinder head cover 21 is disposed on top of the cylinder head 20. The cylinder head cover 21 is attached to the cylinder head 20 so as to cover a pair of camshafts 29. The camshafts 29 are each provided with a cam 29*a* for actuating the intake valve 25 and the exhaust valve 26, respectively. As shown in FIG. 3, a cam chain 30 is meshed with a gear 29*b* of the camshaft 29. The cam chain 30 is meshed with a gear 31*a* of a crankshaft 31 to be discussed later. The camshafts 29 are configured to rotate as the crankshaft 31 rotates.

As shown in FIG. 2, the crankcase 22 is attached to the bottom of the cylinder 19. Inside the crankcase 22 are disposed: a crankshaft 31; a first crank gear 32 and a second crank gear 33 that rotate about the crankshaft 31; a balancer shaft 34; a balancer gear 35 that rotates about the balancer shaft 34; a main shaft 36; a driven gear 37 that rotates about the main shaft 36; and a clutch mechanism 38 attached to the main shaft 36. The crankshaft 31 is an example of the "crankshaft" in accordance with an embodiment of the present invention, and the first crank gear 32 is an example of the "first gear" in accordance with an embodiment of the present invention. The second crank gear 33 is an example of the "second gear" in accordance with an embodiment of the present invention. The balancer shaft 34 is an example of the "second rotary shaft" in accordance with an embodiment of the present invention, and the balancer gear 35 is an example of the "third gear" in accordance with an embodiment of the present invention.

The other end of the connecting rod 24 is rotatably attached to the crankshaft 31. In other words, the crankshaft 31 is configured to rotate as the piston 23 slides relative to the cylinder 19. As shown in FIG. 3, the crankshaft 31 is disposed in the crankcase 22 so as to be perpendicular to the traveling direction of the vehicle (the direction of the arrow FWD) (see FIGS. 1 and 2). The crankshaft 31 is rotatably supported by a pair of bearings 39 mounted in the crankcase 22. The second crank gear 33 is fixed to the crankshaft 31 in the vicinity of one end thereof (in the direction of the arrow R), and configured to rotate together with the crankshaft 31. The first crank gear 32 is fixed to the crankshaft 31 adjacent to the second crank gear 33 in the direction of the arrow L, and configured to rotate together with the crankshaft 31. The second crank gear 33 is configured such that the diameter of the second crank gear 33 is smaller than that of the first crank gear 32.

A generation device 40 is attached to the other end of the crankshaft 31 (in the direction of the arrow L). The generation device 40 is configured to generate electricity along with the rotation of the crankshaft 31. A starter gear 41 is fixed to the crankshaft 31 adjacent to the generation device 40 in the direction of the arrow R. The starter gear 41 is connected to a starter motor 42 (see FIG. 2) via a plurality of intermediate gears (not shown). A gear 31*a* is provided on the crankshaft 31 at a side of the starter gear 41 in the direction of the arrow R (see FIG. 3). The cam chain 30 is meshed with the gear 31*a*.

Figure 4:
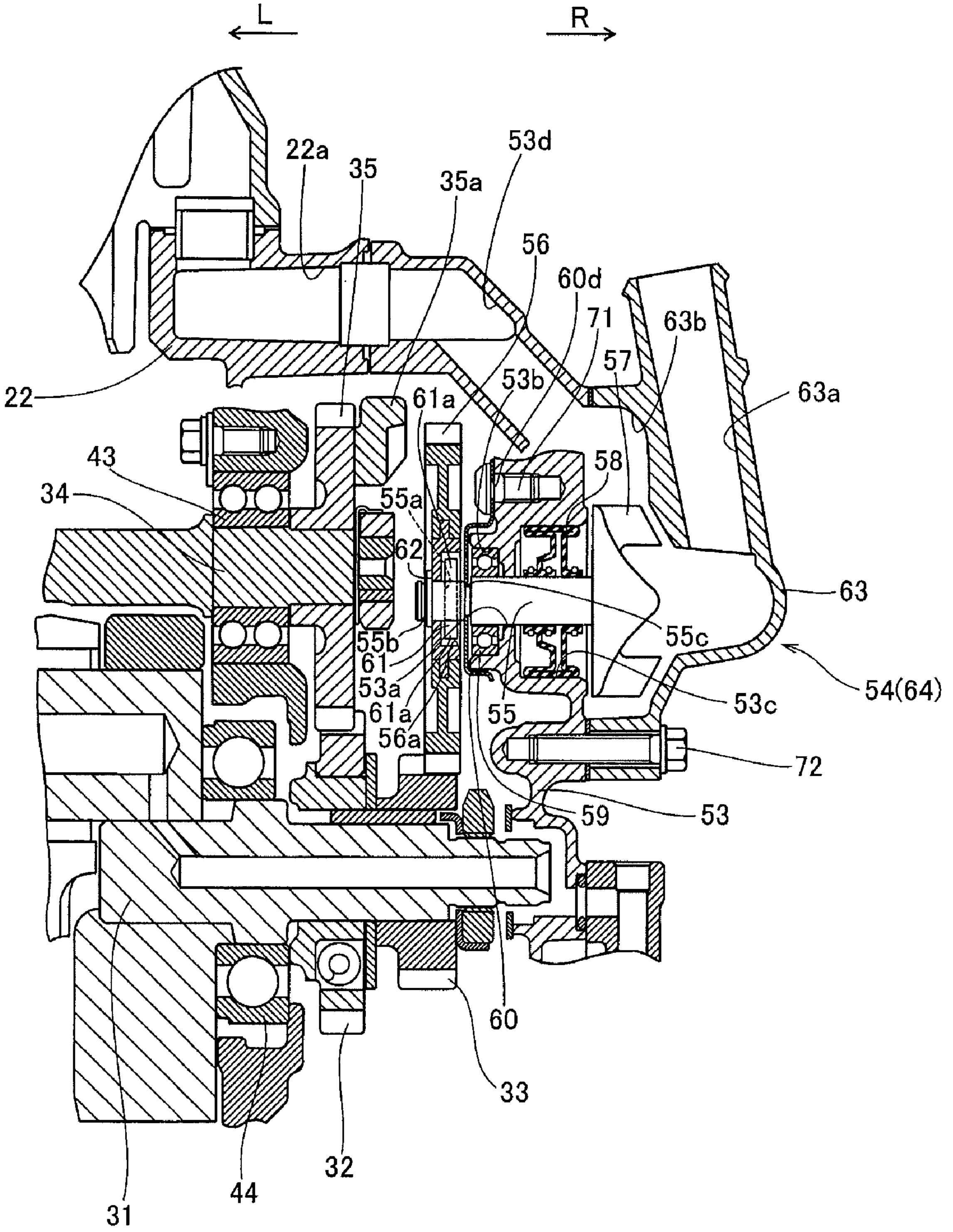
FIG. 4 is a cross sectional view showing the vicinity of a water pump unit of the engine provided in the motorcycle in accordance with the embodiment shown in FIG. 1.

In accordance with an embodiment, as shown in FIG. 2, the balancer gear 35 is configured to be meshed with the first crank gear 32. As shown in FIG. 4, the balancer gear 35 is fixed to the balancer shaft 34. The balancer shaft 34 is rotatably supported by a bearing 43 mounted in the crankcase 22 and provided on the side of the crankcase 22 (in the direction of the arrow L). The bearing 43 is an example of the "first bearing member" in accordance with an embodiment of the present invention. The balancer gear 35 is configured such that the diameter of the balancer gear 35 is larger than that of the first crank gear 32. A balancer 35*a*, made of steel for example, is attached to the balancer gear 35. As shown in FIG. 2, the balancer 35*a* has an arcuate shape, and is fixed to a flat part of the balancer gear 35 by three screw members 70. The balancer 35*a* is attached to the balancer gear 35 so as to be positioned at the lower part of the flat part of the balancer gear 35 when the piston 23 is positioned at the top dead center. Since the balancer gear 35 rotates a half turn as the first crank gear 32 rotates a half turn, the balancer 35*a* is moved to be positioned at the upper part of the flat part of the balancer gear 35 when the piston 23 is positioned at the bottom dead center.

The driven gear 37 is meshed with the second crank gear 33. The driven gear 37 is configured to have a larger diameter than that of the second crank gear 33. That is, the driven gear 37 is configured such that the rotational speed of the driven gear 37 is lower than that of the second crank gear 33. The driving force transmitted to the driven gear 37 is transmitted to the main shaft 36 via the clutch mechanism 38. As shown in FIG. 3, the main shaft 36 is rotatably supported by a pair of bearings 44 mounted in the crankcase 22. The driving force transmitted to the main shaft 36 is transmitted to a drive shaft 46 via a transmission mechanism 45. The drive shaft 46 is rotatably supported by a pair of bearings 47*a* and 47*b* mounted in the crankcase 22. A drive sprocket 48 is attached to an end of the drive shaft 46 in the direction of the arrow L. This allows the driving force transmitted to the drive shaft 46 to be transmitted to the rear wheel 12 (see FIG. 1) via the drive chain 14.

As shown in FIG. 2, an oil pump drive gear 49 is disposed on the main shaft 36 so as to rotate together with the main shaft 36. An oil pump gear 51 is connected to the oil pump drive gear 49 via an idler gear 50. The oil pump gear 51 is disposed in an oil pump unit 52. The oil pump unit 52 is configured to be driven by rotation of the oil pump gear 51.

Figure 5:
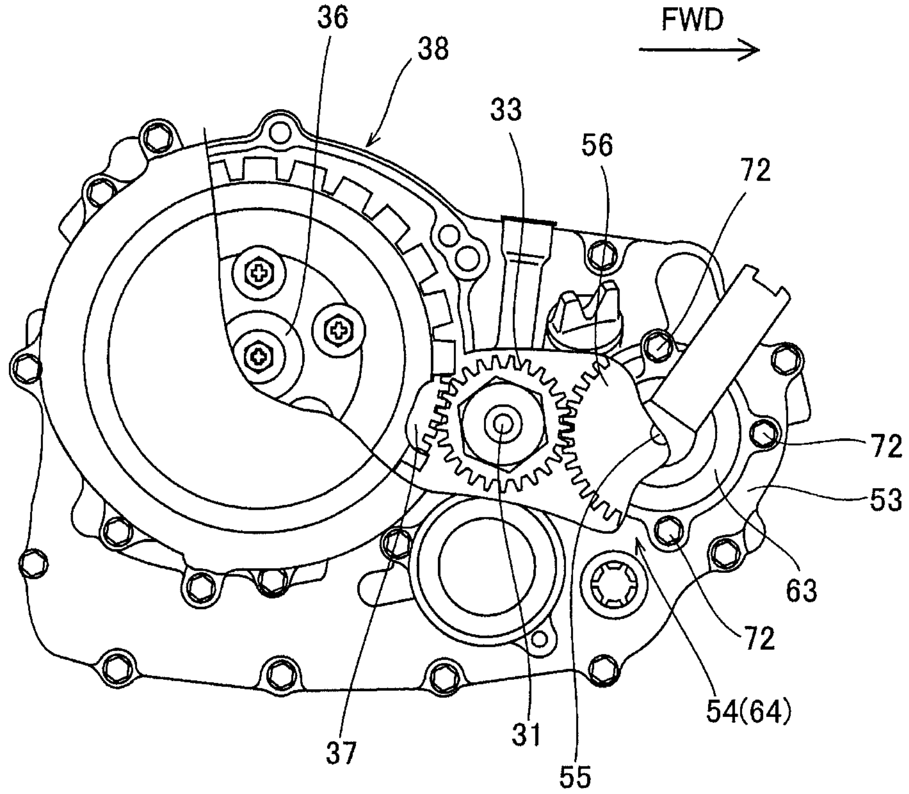
FIG. 5 is a partial cross sectional view showing a crankcase of the engine provided in the motorcycle in accordance with the embodiment shown in FIG. 1.

In accordance with an embodiment, as shown in FIG. 3, a crankcase cover 53 is attached to a surface of the crankcase 22 in the direction of the arrow R so as to cover the surface of the crankcase 22. As shown in FIGS. 4 and 5, a water pump part 54 is attached to the crankcase cover 53. The water pump part 54 has a function of circulating coolant through the inside of the engine 15. The water pump part 54 is an example of the "pump part" in accordance with an embodiment of the present invention.

In accordance with an embodiment, as shown in FIG. 4, the water pump part 54 includes: a water pump shaft 55; a water pump gear 56 attached to the water pump shaft 55; an impeller 57 attached to the water pump shaft 55; a seal member 58; a bearing 59 for rotatably supporting the water pump shaft 55; and a plate member 60 engaged with the water pump shaft 55. The water pump shaft 55 is an example of the "first rotary shaft" in accordance with an embodiment of the present invention, and the water pump gear 56 is an example of the "pump gear" in accordance with an embodiment of the present invention. The bearing 59 is an example of the "second bearing member" in accordance with an embodiment of the present invention, and the plate member 60 is an example of the "first restriction member" in accordance with an embodiment of the present invention.

Figure 6:
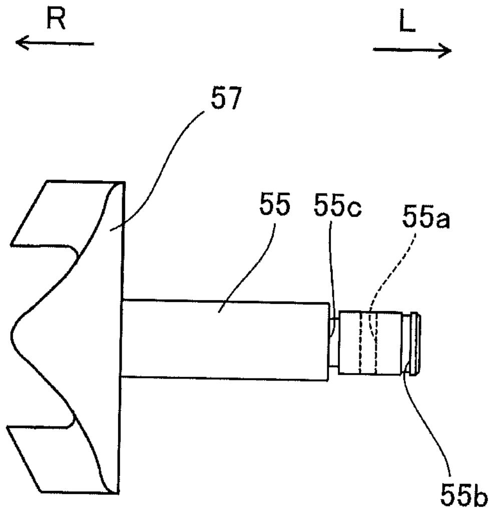
FIG. 6 is a side view of the water pump unit of the engine provided in the motorcycle in accordance with the embodiment shown in FIG. 1.

The water pump shaft 55 in accordance with an embodiment is inserted into an insertion hole 53*a* of the crankcase cover 53. The water pump gear 56 is attached to a side of the water pump shaft 55 in the direction of the arrow L. Specifically, as shown in FIGS. 4 and 6, a pin hole 55*a* is formed in the water pump shaft 55, and a pin 61 (see FIG. 4) is inserted into the pin hole 55*a*. As shown in FIG. 4, the pin 61 is formed such that its length is longer than the diameter of the water pump shaft 55 so that both ends 61*a* of the pin 61 project from the pin hole 55*a*. The water pump gear 56 is formed with a groove 56*a* engageable with the both ends 61*a* of the pin 61. The water pump shaft 55 is rotated together with the water pump gear 56 with the both ends 61*a* of the pin 61 engaged with the groove 56*a*. The water pump gear 56 is meshed with the second crank gear 33, and configured to rotate as the second crank gear 33 rotates.

Figure 7:
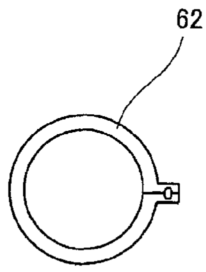
FIG. 7 is a plan view of a circlip of the water pump unit of the engine provided in the motorcycle in accordance with the embodiment shown in FIG. 1.

In accordance with an embodiment, as shown in FIGS. 4 and 6, an engagement groove 55*b* is formed in the outer peripheral surface of the water pump shaft 55 in the vicinity of an end thereof in the direction of the arrow L. The engagement groove 55*b* is an example of the "second outer peripheral groove" of the present invention. As shown in FIG. 4, a circlip (C-ring) 62 is engaged with the engagement groove 55*b*. As shown in FIG. 7, the circlip 62 is formed to project from the outer peripheral surface of the water pump shaft 55 (see FIG. 6), and has a function of restraining the water pump gear 56 from slipping off from the water pump shaft 55. The circlip 62 is an example of the "second restriction member" in accordance with an embodiment of the present invention.

Figure 8:
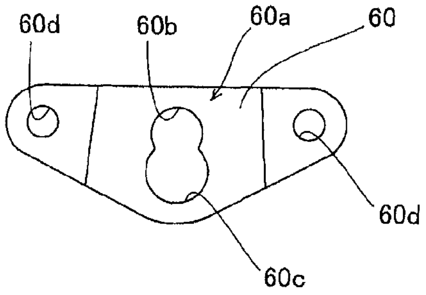
FIG. 8 is a plan view of a plate member of the water pump unit of the engine provided in the motorcycle in accordance with the embodiment shown in FIG. 1.
Figure 9:
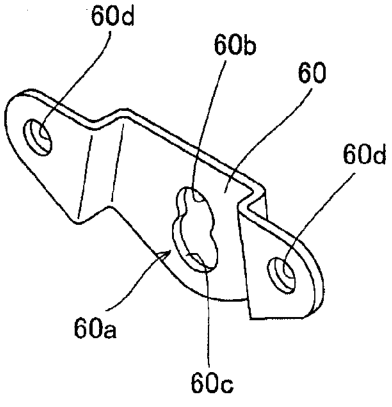
FIG. 9 is a perspective view of the plate member of the water pump unit of the engine provided in the motorcycle in accordance with the embodiment shown in FIG. 1.
Figure 10:
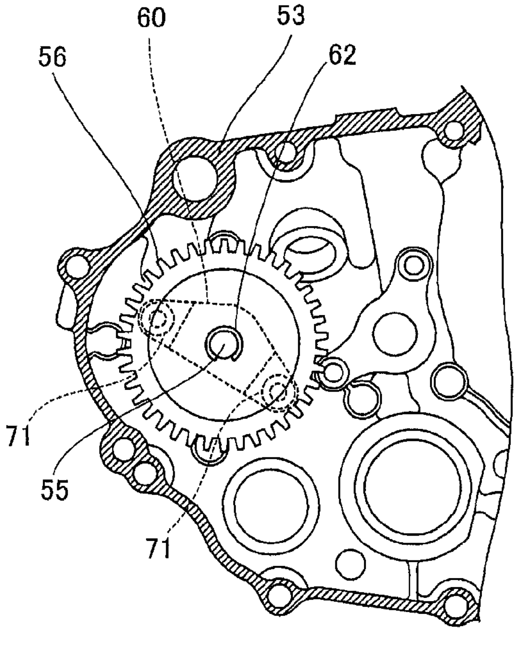
FIG. 10 is a cross sectional view showing the vicinity of a water pump shaft of the engine provided in the motorcycle in accordance with the embodiment shown in FIG. 1.

In accordance with an embodiment, as shown in FIGS. 4 and 6, an engagement groove 55*c* is formed in the outer peripheral surface of the water pump shaft 55 at a side of the pin hole 55*a* in the direction of the arrow R. The engagement groove 55*c* is an example of the "first outer peripheral groove" in accordance with an embodiment of the present invention. As shown in FIG. 4, the plate member 60 is engaged with the engagement groove 55*c*. Specifically, as shown in FIGS. 8 and 9, the plate member 60 is provided with an engagement part 60*a*. The engagement part 60*a* is formed with an engagement hole 60*b* and an insertion hole 60*c*. The engagement hole 60*b* has such a predetermined hole diameter that allows engagement with the engagement groove 55*c* of the water pump shaft 55 (see FIG. 6). The insertion hole 60*c* has a hole diameter larger than the diameter of the water pump shaft 55 (see FIG. 6) so as to enable the water pump shaft 55 to be inserted into the engagement part 60*a*. The insertion hole 60*c* is formed to be continuous with the engagement hole 60*b*. This allows the water pump shaft 55 to be inserted into the insertion hole 60*c* and then moved to the engagement hole 60*b* which is formed continuously with the insertion hole 60*c*, enabling the engagement hole 60*b* of the plate member 60 to be engaged with the engagement groove 55*c* of the water pump shaft 55. A pair of screw insertion holes 60*d* is formed in the plate member 60. As shown in FIGS. 4 and 10, a screw member 71 is inserted into each screw insertion hole 60*d* to screw the plate member 60 to the crankcase cover 53. This makes it possible to restrain movement of the water pump shaft 55, which is engaged with the engagement part 60*a* (see FIG. 8) of the plate member 60, in the vehicle width direction (in the direction of the arrow L and the arrow R).

In accordance with an embodiment, as shown in FIG. 4, the bearing 59 is disposed at a side of the plate member 60 in the direction of the arrow R. The bearing 59 is fitted into a bearing fitting hole 53*b* of the crankcase cover 53. The bearing 59 rotatably supports the water pump shaft 55.

As shown in FIGS. 4 and 6, the impeller 57, made of resin for example, is attached to an end of the water pump shaft 55 in the direction of the arrow R. The water pump shaft 55 is fitted into the impeller 57 so as to rotate the impeller 57 together therewith. As shown in FIG. 4, the seal member 58, made of rubber for example, is disposed on the water pump shaft 55 at a side of the impeller 57 in the direction of the arrow L. The seal member 58 is inserted into a seal member insertion hole 53*c* of the crankcase cover 53. The seal member 58 makes it possible to restrain coolant flowing through in a side of the water pump part 54 in the direction of the arrow R (outer side) with respect to the seal member 58 from entering into a side thereof in the direction of the arrow L (inner side) with respect to the seal member 58. The seal member 58 also makes it possible to restrain oil splashing in the side of the water pump part 54 in the direction of the arrow L (inner side) with respect to the seal member 58 from entering into the side thereof in the direction of the arrow R (outer side) with respect to the seal member 58.

A cover member 63 is attached at an outer side of the impeller 57 (in the direction of the arrow R) by a screw member 72. A coolant flow-in port 63*a* is formed in the cover member 63. The water pump part 54 is configured to take coolant cooled by the radiator 10 (see FIG. 1) into the water pump part 54 from the coolant flow-in port 63*a*. A coolant flow-out port 63*b* is formed in the upper area of the impeller 57. Coolant drawn by the impeller 57 is fed through the inside of the engine 15 from the coolant flow-out port 63*b*. Coolant flow paths 53*d* and 22*a* are provided to extend from the coolant flow-out port 63*b*. The coolant flow paths 53*d* and 22*a* allow the coolant to flow through the inside of the engine 15. The coolant flow-in port 63*a* and the coolant flow-out port 63*b* constitute a water pump unit 64.

In accordance with an embodiment, as shown in FIG. 2, the water pump gear 56 is disposed to overlap the balancer gear 35 as viewed from an end of the crankshaft 31. Specifically, as shown in FIGS. 2 and 4, an extension of the balancer shaft 34 which rotates together with the balancer gear 35 is configured to be disposed within the radius of the water pump gear 56 as viewed from an end of the crankshaft 31. Also, an extension of the water pump shaft 55 (see FIG. 4) which rotates together with the water pump gear 56 is configured to be disposed within the radius of the balancer gear 35.

In accordance with an embodiment, the diameter of the second crank gear 33 is smaller than that of the first crank gear 32 as described above, and therefore the rotational speed of the water pump gear 56 can be reduced while restraining an increase in the diameter of the water pump gear 56. By restraining an increase in the diameter of the water pump gear 56, it is possible to restrain the lower end of the water pump gear 56 from being positioned in the lower area of the crankcase 22.

In accordance with an embodiment, as shown in FIG. 2, an oil pan 22*b* for reserving oil is provided at the bottom of the crankcase 22. The oil pan 22*b* is filled with oil with the oil surface F1 lower than the oil pump gear 51. The water pump gear 56 and the balancer gear 35 are provided higher than the oil pump gear 51, and thus disposed higher than the oil surface F1.

In accordance with an embodiment, the balancer gear 35 and the water pump gear 56 are disposed to overlap each other as viewed from an end of the crankshaft 31 as described above. Therefore, it is possible to reduce the space to be occupied by the balancer gear 35 and the water pump gear 56 as viewed from an end of the crankshaft 31, and thus to restrain an increase in the size of the engine 15 as viewed from an end of the crankshaft 31, unlike the case where the balancer gear 35 and the water pump gear 56 are disposed so as not to overlap each other as viewed from an end of the crankshaft 31.

In accordance with an embodiment, the water pump part 54 is provided with the water pump shaft 55 that rotates together with the water pump gear 56, and the plate member 60 for restraining axial movement of the water pump shaft 55 (in the direction of the arrow L and the arrow R). The plate member 60 can easily restrain axial movement of the water pump shaft 55 (in the direction of the arrow L and the arrow R) even if the water pump shaft 55 is applied with axial force (in the direction of the arrow L and the arrow R).

In accordance with an embodiment, the engagement groove 55*c* is formed in the outer peripheral surface of the water pump shaft 55, and the plate member 60 is provided with the engagement part 60*a* for engagement with the engagement groove 55*c* of the water pump shaft 55. The plate member 60 can be easily engaged with the water pump shaft 55, further restraining axial movement of the water pump shaft 55.

In accordance with an embodiment, the engagement part 60*a* of the plate member 60 is formed with the engagement hole 60*b* for engagement with the engagement groove 55*c* of the water pump shaft 55, and the insertion hole 60*c* formed to be continuous with the engagement hole 60*b* and having a hole diameter larger than the diameter of the water pump shaft 55. Therefore, the plate member 60 can be further easily engaged with the water pump shaft 55 by inserting the water pump shaft 55 into the engagement part 60*a* and having the engagement groove 55*c* of the water pump shaft 55 engaged with the engagement hole 60*b* which is continuous with the insertion hole 60*c*.

In accordance with an embodiment, the water pump part 54 is provided with the circlip 62 for restraining the water pump gear 56 from slipping off from the water pump shaft 55, and the engagement groove 55*b* for engagement with the circlip 62 is formed in the outer peripheral surface of the water pump shaft 55 in the vicinity of one end thereof (in the direction of the arrow L). The circlip 62 and the engagement groove 55*b* can easily restrain the water pump gear from slipping off from the water pump shaft 55.

In accordance with an embodiment, an extension of the balancer shaft 34 of the balancer gear 35 is disposed within the radius of the water pump gear 56, and an extension of the water pump shaft 55 of the water pump gear 56 is disposed within the radius of the balancer gear 35. Therefore, the balancer gear 35 and the water pump gear 56 can be disposed to overlap each other to a greater extent as viewed from an end of the crankshaft 31, and thus the space to be occupied by the balancer gear 35 and the water pump gear 56 can be reduced as viewed from an end of the crankshaft 31.

It should be understood that the embodiments disclosed herein are construed to be illustrative in all respects rather than restrictive. The scope of the present invention is defined by the scope of the claims rather than by the description of the above embodiments, and includes all modifications falling within the scope of the claims and equivalents thereof.

For example, in an above embodiment, a motorcycle is described as an example of the vehicle including an internal combustion engine. However, the present invention is not limited thereto, and may be applied to vehicles provided with an internal combustion engine other than motorcycles, such as bicycles, tricycles, and ATVs (all terrain vehicles).

In an above embodiment, the balancer gear is disposed to overlap the water pump gear as viewed from an end of the crankshaft. However, the present invention is not limited thereto, and any gear other than the balancer gear may be disposed in an overlapping manner.

In an above embodiment, an extension of the balancer shaft is disposed within the radius of the water pump gear, and an extension of the water pump shaft is disposed within the radius of the balancer gear. However, the present invention is not limited thereto, and an extension of the balancer shaft may not be disposed within the radius of the water pump gear, or an extension of the water pump shaft may not be disposed within the radius of the balancer gear.

In an above embodiment, the circlip (C-ring) is provided to restrain the water pump gear from slipping off from the water pump shaft. However, the present invention is not limited thereto, and any member other than the circlip such as a nut may be used to restrain the water pump gear from slipping off from the water pump shaft.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An internal combustion engine comprising:

a crankcase;

a crankshaft accommodated in the crankcase;

a first gear and a second gear disposed inside the crankcase to rotate about the crankshaft;

a third gear meshed with the first gear to rotate as the first gear rotates; and a pump part having a pump gear, wherein the pump gear is meshed with the second gear to rotate as the second gear rotates; and the third gear and the pump gear are disposed to overlap each other as viewed from an end of the crankshaft.

2. The internal combustion engine according to claim 1, wherein the pump part further includes a water pump unit having a coolant flow-in port and a coolant flow-out port.

3. The internal combustion engine according to claim 1, wherein the pump part further includes:

a first rotary shaft that rotates together with the pump gear; and an impeller attached to the first rotary shaft, wherein the pump gear is disposed between the impeller and the third gear.

4. The internal combustion engine according to claim 1, wherein the pump part further includes:

a first rotary shaft that rotates together with the pump gear; and a first restriction member for restraining axial movement of the first rotary shaft.

5. The internal combustion engine according to claim 4, wherein the first rotary shaft includes a first outer peripheral groove formed in an outer peripheral surface of the first rotary shaft; and wherein the first restriction member includes an engagement part to be engaged with the first outer peripheral groove of the first rotary shaft.

6. The internal combustion engine according to claim 5, wherein the engagement part of the first restriction member includes:

an engagement hole to be engaged with the first outer peripheral groove of the first rotary shaft; and an insertion hole formed to be continuous with the engagement hole and having a hole diameter larger than a diameter of the first rotary shaft.

7. The internal combustion engine according to claim 4, further comprising:

a first bearing member disposed on a side of the crankcase; and a second rotary shaft that rotates together with the third gear, wherein the first bearing member is configured to rotatably support the second rotary shaft of the third gear; and wherein the pump part further includes a second bearing member for rotatably supporting the first rotary shaft of the pump gear.

8. The internal combustion engine according to claim 4, wherein the pump part further includes a second restriction member for restraining the pump gear from slipping off from the first rotary shaft; and the first rotary shaft further includes a second outer peripheral groove formed in an outer peripheral surface of the first rotary shaft to be engaged with the second restriction member.

9. The internal combustion engine according to claim 1, wherein the pump gear and the third gear are configured to be positioned higher than an oil surface of oil reserved inside the crankcase.

10. The internal combustion engine according to claim 1, further comprising a crankcase cover provided to cover at least a part of a surface of the crankcase, wherein the pump part is attached to the crankcase cover.

11. The internal combustion engine according to claim 1, further comprising:

a second rotary shaft that rotates together with the third gear;

wherein the third gear includes a balancer;

wherein an extension of the second rotary shaft of the balancer is disposed within a radius of the pump gear; and wherein the pump part further includes a first rotary shaft that rotates together with the pump gear, wherein an extension of the first rotary shaft of the pump gear is disposed within a radius of the third gear.

12. The internal combustion engine according to claim 1, wherein the second gear is formed such that a diameter of the second gear is smaller than that of the first gear.

13. A vehicle comprising the internal combustion engine according to claim 1.

14. A vehicle comprising the internal combustion engine according to claim 3.

15. A vehicle comprising the internal combustion engine according to claim 4.

16. A vehicle comprising the internal combustion engine according to claim 6.

17. A vehicle comprising the internal combustion engine according to claim 8.

18. A vehicle comprising the internal combustion engine according to claim 9.

19. A vehicle comprising the internal combustion engine according to claim 11.

20. A vehicle comprising the internal combustion engine according to claim 12.

* * * * *